Feb. 23, 1971   O. W. GRAVELEY   3,564,814
BAGGING CHECKOUT COUNTER
Filed Aug. 26. 1968   2 Sheets-Sheet 1
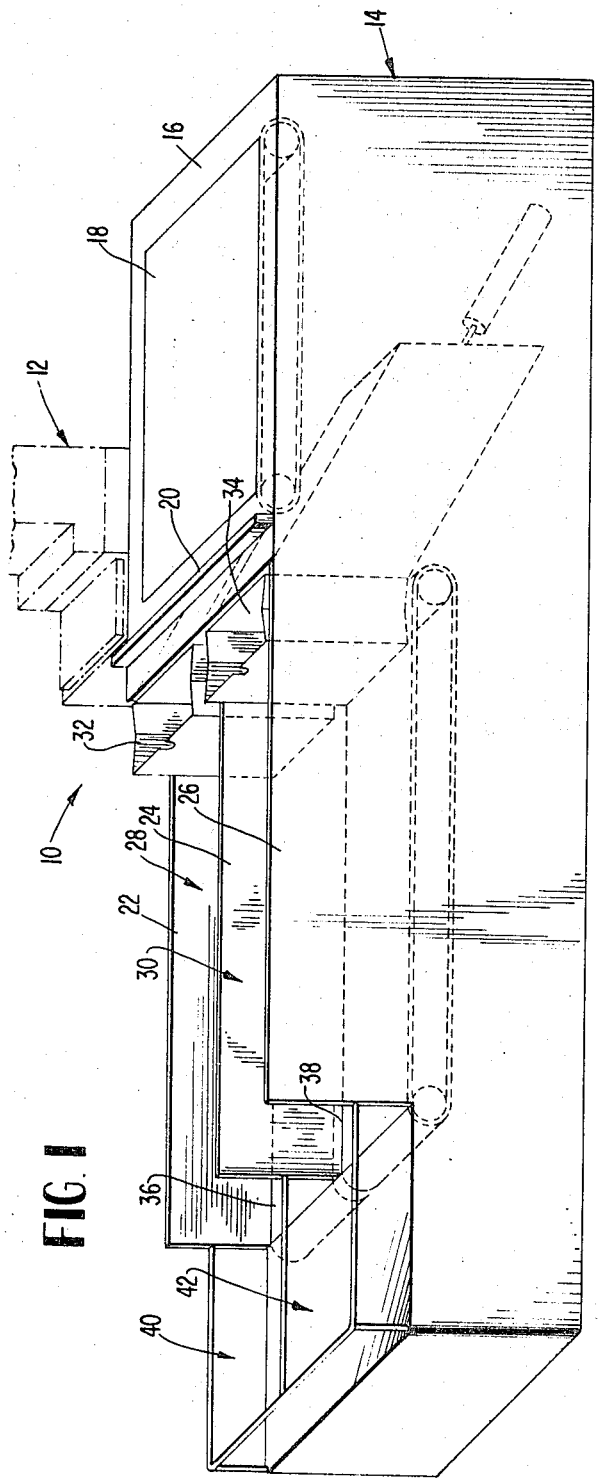
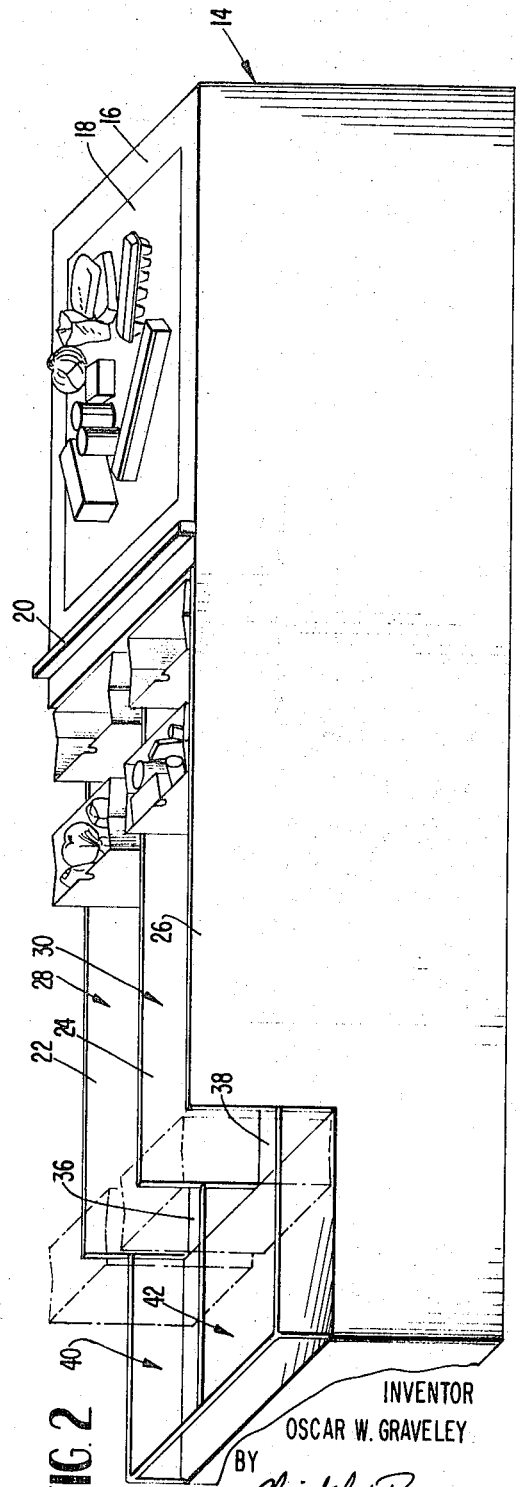
INVENTOR
OSCAR W. GRAVELEY
BY
Christel & Bean
ATTORNEY Feb. 23, 1971 — O. W. GRAVELEY — 3,564,814
BAGGING CHECKOUT COUNTER
Filed Aug. 26, 1968 — 2 Sheets-Sheet 2
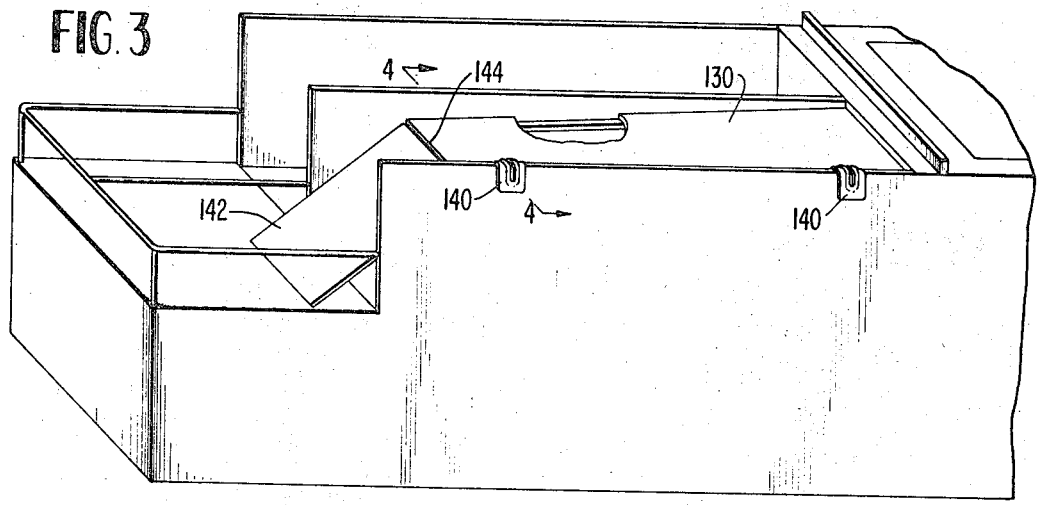
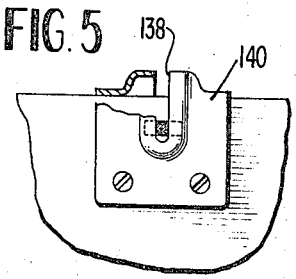
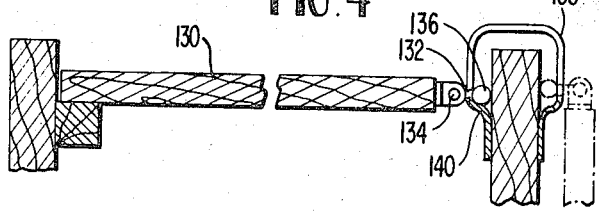
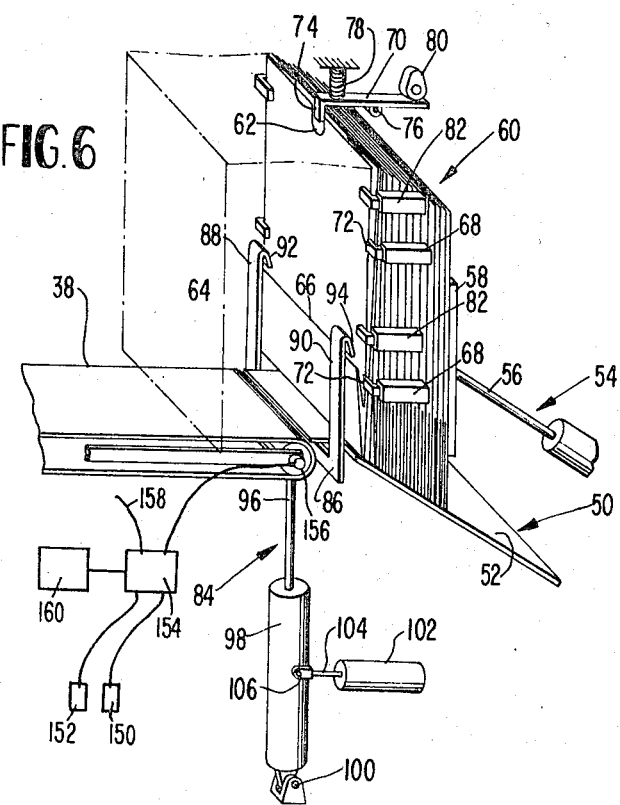
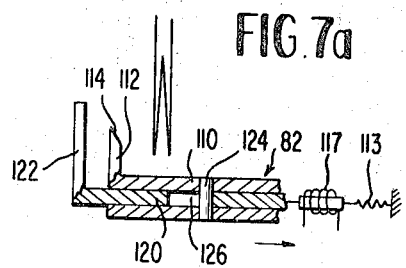
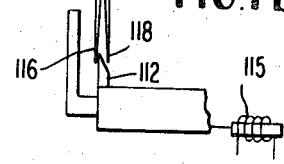
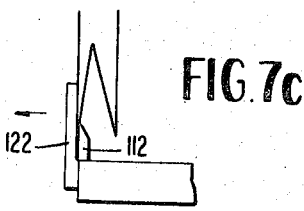

United States Patent Office 3,564,814
Patented Feb. 23, 1971

3,564,814
BAGGING CHECKOUT COUNTER
Oscar W. Graveley, Sanborn, N.Y., assignor to Niagara Frontier Services, Inc., Buffalo, N.Y.
Filed Aug. 26, 1968, Ser. No. 755,139
Int. Cl. B65b 43/26, 67/04
U.S. Cl. 53—189    11 Claims

ABSTRACT OF THE DISCLOSURE

A check-out arrangement for supermarkets in which a pair of adjacent and parallel bagging lanes are provided and there being mechanism automatically to open and feed bags to one end of each lane so that the cash register attendant continuously is presented with a choice of two bags into which articles to be checked may be disposed. Belt conveyors form the bottoms of the lanes and are adapted for selective operation to advance the bags in the lanes whenever a bag is filled or a check-out operation in completed, the conveyed bag being automatically replaced by an open bag. The lanes act as accumulating devices for discharging filled bags to a pickup station.

BACKGROUND OF THE INVENTION

One of the major problems confronting retail establishments such as supermarkets handling a large volume of business is the time required for checking out the individual patrons. Conventionally, the merchandise is handled twice, once by the cashier when recording the cost of the individual items on the cash register and once by the person bagging the merchandise. The actual bagging may be done by bagging boys or by the cash register attendant or by both but, in any event, conventional procedures ordinarily reduce the effective cash register time for the cashier or attendant to a value which is between 30–50% of the total time involved, the remainder of the time being taken up primarily by the bagging operation. The minimum cash register time occurs when the bagging boys are moving from register to register or helping customers with cart loads, but, in any event, even assuming a maximum of efficiency, the cashier cannot possibly maintain as much as 50% effective time attending to the actual checking out and registering the cost of the merchandise items on the cash register.

Although various bagging procedures which may or may not be semi-automated in operation have been proposed, none, to my knowledge, materially increases the available cash register time and this represents a serious problem to the industry inasmuch as a main drawback to supermarket shopping is the time actually taken up by the checking out process and it is not unusual for long lines of customers to be queued up behind each of the checking out counters available during rush periods.

BRIEF SUMMARY OF THE INVENTION

The present invention relates to an improved form of checkout counter arrangement wherein bags are automatically opened and presented in close proximity to the counter portion whereat the articles of merchandise are placed by the customer. There are two lanes of bagging available to the cash register attendant so that first of all the attendant need not expend time in selecting the articles being checked out as to their relative fragility and need not correspondingly select hard items for placement at the bottom of the bag while selecting soft items for placement near the top of the bag. Instead, there are always two bagging lanes available to the attendant, one lane of which may be used solely for hard items and the other lane of which may be used solely for soft items or combinations may be effected always reserving soft items for placement near the top of any bag.

Secondly, the two-lane system hereinabove described when provided with automatic conveying means in each lane and corresponding separate control means for the conveyor mechanisms allows the operator to move a filled bag ahead while a new bag is presented in its place during the time a bag in the other lane is still available for filling. In this way, the bagging may be effected in a more continuous fashion and the lanes effectively act as accumulators for the purchases of any one customer ultimately to be discharged by the conveying mechanisms to a remote pickup point.

BRIEF DESCRIPTION OF THE DRAWING FIGURES

FIG. 1 is a perspective view of an illustrative bagging checkout counter arrangement of this invention, shown with a pair of bags open and ready for filling;

FIG. 2 is a similar view thereof, shown with a pair of filled bags and with another pair of bags open and ready for filling;

FIG. 3 is an enlarged, fragmentary perspective view thereof, showing a cover mechanism in place thereon;

FIG. 4 is an enlarged, fragmentary sectional view thereof taken about on line 4—4 of FIG. 3;

FIG. 5 is a fragmentary detail view thereof;

FIG. 6 is a generally schematic, perspective view showing the bag magazine and opening mechanism; and FIGS. 7a, 7b and 7c are generally schematic, fragmentary views showing different positions of the bag opening and advancing elements.

DETAILED DESCRIPTION OF THE INVENTION

With reference at this time more particularly to FIG. 1, the general arrangement of a check-out counter is shown therein with the cashier's position being indicated generally by the reference character 10 in front of the cash register mechanism indicated by the reference character 12. The check-out counter itself is in the form of an enclosure 14 housing various of the component parts hereinafter more particularly described and being provided at one end with the elevated platform portion 16 having an endless conveyor belt mechanism 18 thereon upon which purchased articles may be placed by the customer for subsequent advancement to the stop rail 20 conveniently located alongside of the operator's station. The opposite end of the check-out counter commencing immediately beyond the stop rail 20 is vertically stepped downwardly and divided by partition members 22, 24 and 26 into a pair of side-by-side lanes 28 and 30, which lanes are adapted to be fed by bag feed and opening devices hereinafter described so as continuously to present opened bags 32 and 34 at the ends of the lanes adjacent to the operator's station 10. The bottom walls of the lanes are provided with endless conveyor flights 36 and 38 which, when operated, are effective to move bags therealong for ultimately being discharged to the lane extensions 40 and 42 whereat the bagged articles may be picked up by the customer. Alternatively, the lanes may be extended to some external point for outside pickup either by attendants or by the customers themselves.

It is an important feature of this invention that the operator continuously has available two lanes for packaging the articles disposed on the counter platform portion 16 advanced to the stop rail 20. The bag nearest to the operator can be of light weight construction adapted to receive and adequately contain lighter articles of purchase whereas the far bag can be of heavier construction adapted to receive heavier articles such as canned goods and the like. However, for maximum efficiency it is preferred that both bags be of heavy construction. Switch means hereinafter described are provided in the region of the station 10 for convenient manipulation by the cashier to perform the advancement of the bag 34 alone or of the two bags 32 and 34 simultaneously, as may be dictated by the requirements of the purchase made by the individual customer. To elucidate, it is frequently the case that the customer's purchase will contain a greater proportion of heavier articles most of which will be placed in the far bag whereas lighter articles and articles which may be damaged such as bread, eggs and the like, are placed in the near bag 32 and it frequently happens that the far bag will be filled more quickly than the near bag, at which time the operator may actuate the endless belt 38 to advance the bag 34 which has been filled while retaining the unfilled bag 32 in its initial position. As will be described more particularly hereinafter, the act of advancing the bag 34 will allow a replacement for it immediately to be disposed in operative position for the reception of additional articles of purchase. In this way, the lanes 28 and 30 act as accumulators to receive the entire purchase of any one customer in closely grouped fashion and by making the lanes 28 and 30 of substantial length, the operator may manipulate the belts 36 and 38 in such fashion as to accumulate several customers' purchases thereon wherein the individual groups of bags containing the purchases are spaced from each other so as to be suitably separated for easy recognition of the individual purchases.

It is another important feature of the present invention that the bag opening and feeding mechanisms operate automatically to replace a bag as it is moved away from the loading station. The elevated platform portion 16 of the counter construction presents a hollow space therebeneath in which bag magazine assemblies 50 are disposed, one such magazine assembly being shown more particularly in FIG. 6 and which will be seen to include a bottom or ramp portion 52 which leads up to the level of the upper flight of the endless conveyor mechanism 38 in the associated lane and established thereat a discharge mouth for discharging and feeding bags onto the associated endless conveyor. The magazine assembly also includes a suitable pusher device indicated generally by the reference character 54 and which may take the form of a spring loaded piston rod 56 having a pusher plate 58 at one end to engage against the rear side of a supply 60 of bags substantially as shown in FIG. 6, the bags being disposed in their normal folded condition and having their thumb holes 62 facing in the direction shown. Thus, the conventional folded bottom portion 64 of each bag is facing forwardly as shown, each being folded flat against the bag body with the forward edge bottom fold portions 66 being projected upwardly as will be readily understood by those skilled in the art.

The bag opening and feeding assemblies each comprise a plurality of stop members normally holding back the entire stack of bags in the magazine and which index the leading bag to allow bag opening and bag advancing members properly to engage such leading bag. These stop members are indicated, in FIG. 6, by reference characters 68 and 70, it being seen that there are a pair of stop members 68 along each side of the stack at the discharge mouth, each having a laterally inwardly directed finger portion 72 engaging along the forwardly facing sides of the leading bag, the fingers 72 being, however, sufficiently short to allow a bag to be forced past them when the opening and advancing members operate, as will hereinafter be apparent. The stop member 70 engages the rear side of the leading bag, through the thumb opening 62 thereof, such member 70 having a depending finger portion 74 for this purpose and being mounted upon a suitable pivot 76 and normally spring urged by the resilient member 78 into the position shown engaging against a cam member 80.

The bag opening and advancing elements 82 also cooperate with the opposite side edges of the leading bag in spaced relationship to the stationary stop members 68 and are adapted to engage the leading side edges of the exposed bag in gripping relation therewith and to advance such gripped portions of the bag to operate, in cooperation with the bottom opening assembly indicated generally by the reference character 84, to open and advance the bag onto the upper flight of the endless conveyor 38 as shown in FIG. 6. The bottom opening assembly 84 includes a head portion 86 having upstanding arms 88 and 90 provided with hook like end portions 92 and 94 adapted to engage over the edge 66 of the bag bottom 64, the head 86 being connected to a piston rod member 96 projected and retracted under the action of the cylinder 98 for bag bottom opening purposes. The cylinder 98 is pivotally attached as at 100 and is swung in an arc under the action of a further cylinder and piston assembly 102, 104, the latter being pivotally connected as at 106 to the cylinder 98. The operation of the bag bottom opening device is such as to retract the piston 96 while the piston 104 is projected, thereby to swing the head 86 in a downwardly and outwardly directed arc. This action, in conjunction with the action of the grippers and advancers 82, as will be presently described, acts to force the opposite side edges of the bag past the stationary stop members 68 and allow them to grip the rear side edges of the bag to temporarily hold the bag in the open position shown in dash dot lines in FIG. 6 until such time as the weight of articles in the open bag and movement of the conveyor 38 forces the bag past and beyond the control of the side gripping stop members 68. The cam 80 is actuated whenever the conveyor is advanced to swing the stop member 70 upwardly to allow release of this portion of the bag. In the meantime, the side stop elements 68 retain the leading bag of the remaining supply of bags in position in readiness for another bag opening and advancing cycle.

With reference now to FIGS. 7a, b and c, each of the members 82 will be seen to consist of a first body 110 carrying an inwardly directed gripping finger element 112 provided with a beveled edge 114 so that it may easily engage, as is shown in FIGS. 7b, between the side edges 116 and 118 of the leading and trailing walls of the associated bag. The stationary members 68 index the exposed or leading bag so that withdrawal of the body 110 from the position of FIG. 7a to that of FIG. 7b will project the member 112 in proper position between the two edges 116 and 118, it being appreciated that the edge folds 116 and 118 tend to spring apart somewhat. Each member 82 also includes a body 120 which is slidable relative to the body 110 and which carries an inwardly directed gripper portion 122 cooperating with the gripper portion 112 previously described. The body 110 carries a stop pin element 124 received within an appropriate slot 126 in the body member 120, the two gripper elements 112 and 122 normally being spring urged apart as indicated at 113 in FIG. 7a and having mechanism associated therewith to bring them into clamping relationship as is shown in FIG. 7c. The entire assembly 82, as has been previously described, is initially retracted from the position of FIG. 7a to the position of FIG. 7b wherein the gripper 112 is properly located and, thereafter the body 120 is retracted to clamping relationship as shown in FIG. 7c and then the entire assembly 82 is advanced or projected in the direction of the arrow in FIG. 7c by suitable mechanism to spread apart the bag and aid and assist in the opening action attributable to the assembly 84. The net result is to project the bag into the open position shown in phantom lines in FIG. 6.

The mechanism for retracting and advancing body 110, and with it body 120, can include a solenoid 115, while the mechanism for retracting body 120 relative to body 110 and against the bias of spring 113 can include a solenoid 117. Solenoid 115 can advance bodies 110 and 120 while solenoid 117 maintains them in clamping engagement.

Any suitable powering source may be provided for the various mechanisms described hereinabove, inclusive of the endless conveyor mechanisms for advancing the filled bags along their associated lanes and there is preferably provided foot treadle switch mechanisms under the control of the cash register attendant for selectively advancing either one or both of the conveyor mechanisms of the lanes. As shown schematically in FIG. 6, a pair of foot treadles 150 and 152 are connected to a control circuitry, identified as 154, in turn operatively connected to a drive roll 156 for driving conveyor 38 in an endless orbital path and operatively connected as indicated at 158 to the drive roll (not shown) for driving conveyor 36. Treadle 150 controls operation of conveyor 38 and treadle 152 controls operation of conveyor 36. These treadles can be actuated simultaneously or selectively, as desired. A suitable power source 160 is connected to control circuitry 154, which circuitry is preferably so arranged that a bag opening cycle is effected automatically upon actuation of the conveyor in each lane with a time delay mechanism allowing the filled bag to be conveyed out of the way a suitable distance, for example a foot, before presentation of the open empty bag. Accordingly, as soon as the bags in a lane have been advanced beyond the bagging position a new bag will be opened automatically in readiness for further loading procedures. The details of such circuitry will be readily understood by those skilled in the art and therefore require no further elaboration.

There are many times during the normal working day at which the full extent of the capacity of the instant device need not be utilized and during such times, the far lane may be blocked off by suitable cover mechanism shown in FIGS. 3–5. Such cover mechanism may take the form of a cover member 130 provided with hinge pins 132 pivotally connected as at 134 to the cover 130 of an associated mounting bracket 140, as may be seen in FIG. 5 whereby the cover may be disposed in the position shown in FIG. 4 in full lines but is normally disposable in the phantom line position when both lanes are being utilized. An identical cover mechanism also can be provided for the near lane, hinged to the outside partition wall 22, whereby both lanes can be covered if desired. The cover mechanisms can be used as counters along which merchandise can be slid. An end extension 142 may be hingedly connected as at 144 to the main cover portion 130 as may be seen in FIG. 3 to facilitate this.

Accordingly, it is seen that my invention fully accomplishes its intended objects. It will be appreciated that the foregoing detailed description has been given by way of illustration only, without thought of limitation. For example, other bag opening mechanisms can be used with the checkout counter assembly of my invention.

What is claimed is:

1. A bagging check-out counter assembly for supermarkets and the like comprising in combination, a check-out area for articles to be baged, a pair of lanes extending side-by-side from said area, a conveyor for each line, a bag magazine for each lane, each magazine being disposed in the region adjacent said check-out area and having a discharge opening into its lane adjacent that end thereof, bag opening means adjacent each discharge, each bag opening means including stop means for temporarily holding back the supply of bags in the associated magazine, and mechanism for opening the leading bag and positioning it in the associated lane, and means for selectively operating said conveyors.

2. A bagging check-out counter assembly as set forth in claim 1, wherein said lanes extend from said check-out area to a remote bag pick-up area, the length of said lanes being sufficient to permit the accumulating of several bags in each said lane.

3. A bagging check-out counter assembly as set forth in claim 1, wherein said conveyors define bottom walls for said lanes, together with upstanding partitions defining side walls for said lanes.

4. A bagging check-out counter assembly as set forth in claim 3, together with a cover member for at least one of said lanes, and means mounting said cover member on one of said partitions for movement between an out-of-the way position along one of said side walls and a lane-covering position across the associated one of said lanes.

5. A bagging check-out counter assembly as set forth in claim 1, wherein said last-named means include means for selectively operating said conveyors independently and conjointly.

6. A bagging check-out counter assembly as set forth in claim 1, wherein said mechanism for opening the leading bag includes means for engaging the leading wall thereof and for relatively moving the leading and trailing walls thereof to open said leading bag.

7. A bagging check-out counter assembly as set forth in claim 6, wherein said leading wall engaging means includes means for gripping the opposite side edges of said leading wall and moving the same away from said trailing wall, and means for releasably holding said trailing wall.

8. A bagging check-out counter assembly as set forth in claim 1, wherein said magazine is adapted to contain a supply of folded bags with the folded bottom walls thereof facing forwardly, and wherein said mechanism for opening the leading bag includes means for engaging the upper edge of the bottom wall thereof and unfolding the same downwardly and forwardly.

9. A bagging check-out counter assembly as set forth in claim 8, wherein said mechanism for opening the leading bag also includes means for engaging the leading wall thereof and moving the same away from the trailing wall thereof.

10. A bagging check-out counter assembly for supermarkets and the like comprising in combination, a check-out area for articles to be bagged, at least one lane extending from said area, a conveyor for said lane, a bag magazine for said lane disposed in the region adjacent said check-out area and having a discharge opening into said lane, bag opening means adjacent said discharge including stop means for temporarily holding back the supply of bags in said magazine and mechanism for opening the leading bag and positioning it in an upright position on said conveyor, said mechanism including means for engaging the leading wall of said bag and relatively moving the leading and trailing walls thereof to open said leading bag, and means for selectively operating said conveyor thereby to remove a filled bag from said check-out area.

11. A bagging check-out counter assembly as set forth in claim 10, wherein said magazine is adapted to contain a supply of folded bags with the folded bottom walls thereof facing forwardly, and wherein said mechanism for opening the leading bag includes means for engaging the upper edge of the bottom wall thereof and unfolding the same downwardly and forwardly.

References Cited

UNITED STATES PATENTS

| 3,025,651 | 3/1962 | Stanley | 53—384 |
| 3,050,918 | 8/1962 | Helm et al. | 53—386 |
| 3,062,324 | 11/1962 | Hennion | 53—391X |
| 3,077,950 | 2/1963 | Brown | 53—390X |

THERON E. CONDON, Primary Examiner

R. L. SPRUILL, Assistant Examiner

U.S. Cl. X.R.

53—384, 391